United States Patent [19]

Gindy et al.

[11] Patent Number: 4,722,407

[45] Date of Patent: Feb. 2, 1988

[54] CALIBRATING DEVICE FOR LOAD CELLS

[75] Inventors: Sherif S. Gindy, Troy; Steven W. Maurer, Fraser, both of Mich.

[73] Assignee: Eaton Corporation, Cleveland, Ohio

[21] Appl. No.: 37,481

[22] Filed: Apr. 13, 1987

[51] Int. Cl.$^4$ .................. G01G 19/52; G01L 25/00
[52] U.S. Cl. ........................................ 177/50; 73/1 B; 177/146
[58] Field of Search ............... 73/1 B; 177/208, 209, 177/254, 50, 146

[56] References Cited

U.S. PATENT DOCUMENTS

| | | | |
|---|---|---|---|
| 3,194,050 | 7/1965 | Ruge | 73/1 B |
| 3,261,203 | 7/1966 | Young | 177/208 X |
| 3,736,999 | 6/1973 | Lademann | 177/208 |
| 3,924,443 | 12/1975 | Hebert | 177/50 X |
| 4,009,604 | 3/1977 | Taber et al. | 177/208 X |
| 4,292,835 | 10/1981 | Bickford | 73/1 B |
| 4,309,896 | 1/1982 | Laurent | 73/1 B |
| 4,658,921 | 4/1987 | Karpa | 177/50 |

Primary Examiner—George H. Miller, Jr.
Attorney, Agent, or Firm—D. A. Rowe; A. E. Chrow

[57] ABSTRACT

A device (100) for calibrating load cells is provided. Device (100) features an intermediate chamber (8) providing fluid communication between spaced-apart fluid chambers (4) and (6). Chambers (4) and (6) have respective upper open ends (5) and (7) with chamber (4) connected to a plunger member (12) by a flexible seal (14) and chamber (6) connected to a plunger member (20) by a flexible seal (18) such when dead weights $W_{1,2...n}$ are placed upon plunger (12) fluid pressure exerts an upward force (F) against plunger (20) for calibrating a load cell (2) placed between plunger (20) and a rigid frame (21) that is defined by the equation:

$$F = (A_R/A_P)(W_{1,2...n} + W_P - S_P) - W_R - S_R$$

Where:
$A_R$ = area of plunger (20)
$A_P$ = area of plunger (12)
$W_P$ = weight of plunger (12)
$S_P$ = resistance force of seal (14)
$W_R$ = weight of plunger (20)
$S_R$ = resistance force of seal (18).

5 Claims, 3 Drawing Figures

CALIBRATING DEVICE FOR LOAD CELLS

INTRODUCTION

This invention relates generally to a device for calibrating a load cell such as a strain gauge and more particularly to a device adapted to provide a calculable force for calibrating the load cell arising from amplification of fluid pressure provided by standardized dead weights.

DESCRIPTION OF THE INVENTION

Load cells or pressure transducers such as strain gauges and piezoelectric devices have been employed for many years for providing an electrical signal corresponding to an applied force.

Such load cells, however, require initial calibration to determine the relationship between the force and the signal provided by the load cell as well as periodic calibration to determine whether changes in the relationship between the force and signal have occurred to insure accuracy in use and interpretation of the load cell signal relative the applied force.

One of the most common methods for calibrating load cells, particularly of the type responsive to compressive forces, is to place standardized deadweights upon the load cell and correlate the signal output of the load cell to the particular deadweights applied. Although featuring an accuracy of about 0.001%, this type of method is generally limited to a total standardized weight of about 2000 pounds as well as being inconvenient in having to balance heavy loads upon load cells that are most apt to be smaller in surface area than the deadweights.

Another method used in the past for calibrating load cells has been to place standardized deadweights in a pan that hangs below the load cell and is adapted to apply a force to the load cell directly related to the weight of the standardized deadweights. Although such method has been used to provide forces in excess of 100,000 pounds with a reported accuracy of about 0.01%, it again requires inconvenient handling of large weights due to the direct relationship involved.

Yet another method used in the past for calibrating load cells is the use of direct application of standardized weights in combination with a reference load cell. However, such method again involves direct application of standardized deadweights that in many cases may be extremely heavy, and inconvenient, if not impossible, to handle.

Perhaps one of the most common methods of calibrating load cells has been to apply a force directly to the load cell by either hydraulic or mechanical means and compare the signal output of the load cell against a standard reference load cell in series with the one being calibrated. Such method however introduces additional inaccuracies by use of two load cells and is reported to be useful only in semi-static and not static load applications with an accuracy of about 0.05%.

Particular applications of load cells for sensing weight transmitted by pressure are disclosed, for example, in U.S. Pat. Nos. 3,091,303 and 3,736,999, the disclosures of which are incorporated herein by reference. However, both again involve direct relationships between the weight and force transmitted and are generally inoperable to provide the preciseness required for load cell calibration.

SUMMARY OF THE INVENTION

Accordingly, it is an object of this invention to provide a fluid operated device for calibrating load cells that is convenient to use and highly accurate.

It is another object of this invention to provide a fluid operated device for calibrating load cells that is adapted to magnify fluid pressure.

It is still another object of this invention to provide a fluid operated device using standardized deadweights for calibrating load cells that is adapted to magnify the force arising from the deadweights.

It is yet another object of this invention to provide a standardized deadweight load cell calibrating device operable by means of fluid to impart a calculable magnified force to the load cell above that which is provided by the deadweights.

DESCRIPTION OF THE PREFERRED EMBODIMENTS

Figure 1:
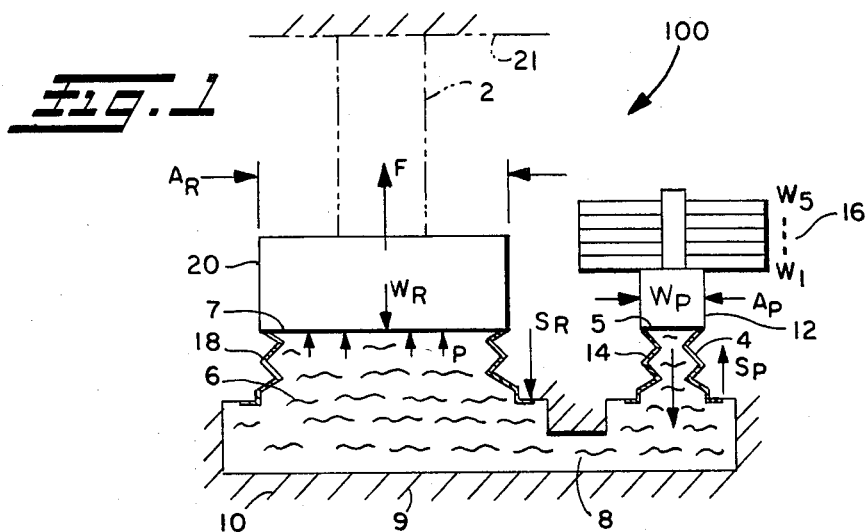
FIG. 1 is a schematic side elevation of a load cell calibrating device 100 made in accordance with the invention.

Device 100 of FIG. 1 has a frame 10 that includes a first chamber 4 for containing fluid 9. Chamber 4 is substantially vertical having an upper open end 5. Device 100 includes a second chamber 6 for containing fluid 9 that is spaced-apart from chamber 4.

Chamber 6 like chamber 4 is substantially vertical and has an upper open end 7.

A third chamber 8 provides fluid communication between chambers 4 and 6 as shown in FIG. 1.

Although the term "fluid" as used herein may be a compressible gas such as air, it is preferably an incompressible fluid such as water or more preferably a suitable hydraulic oil due to inaccuracies that may be introduced by compressible gases.

A plunger member 12 having a downwardly directed weight denoted as $W_P$ is disposed above upper end 5 of chamber 4. Plunger member 12 is adapted to hold individual standardized calibrating weights 16 on the side thereof facing away from chamber 4 that for purposes of illustration, have downwardly directed weights denoted as $W_1 \ldots W_5$ which is hereinafter more generally denoted $W_{1, 2 \ldots n}$.

A flexible seal 14 such as a bellows type seal extends between member 12 and a wall surrounding chamber 4 to provide a fluid tight seal. Seal 14 has an inherent resistance to downward movement of member 12 denoted as upwardly directed force $S_P$. Seal 14 may, for example, be a flexible metal seal to eliminate or minimize any expansion from fluid pressure.

Plunger member 12 and chamber 4 have essentially the same cross-sectional area denoted $A_P$ in FIG. 1. Member 12 is thus operable to move upwardly and downwardly according to the standardized deadweights 16 placed upon it since downward movement is resisted by the presence of fluid 9 in chamber 4.

A ram member 20 is disposed above chamber 6 and a flexible seal 18 such as a bellows extends between member 20 and frame 10 to provide a fluid tight seal. Seal 18 has an inherent resistance to upward movement of member 20 denoted as downwardly directed force $S_R$ as does the weight of member 20 denoted as $W_R$. Seal 18, like seal 14, may be a flexible metal seal to eliminate or minimize expansion from fluid pressure. In case the effect of seals 14 and 18 is not completely eliminated, it will still yet be totally predictable and will hence have no effect on system accuracy. In any event, where seals 14 and 18 are substantially dimensionally the same, since both are exposed to the same fluid pressure, the effect of their expansion would be cancelled out.

Member 20 and chamber 6 have essentially the same cross-sectional area denoted as $A_R$. Chambers 4 and 6 are preferably cylindrical as are plunger member 4 and ram member 20 as well as seals 14 and 18.

A side of member 20 facing away from chamber 6 is adapted to apply a force F (hereinafter defined) to load cell 2 shown in FIG. 1 that is disposed intermediate member 20 and rigid frame 21. Although load cell 2 is shown as being compressed by force F in FIG. 1, the arrangement between member 20 and frame 21 can be altered so that force F applies a tension or bending moment to load cell 2 where calibration under such conditions is desired.

Figure 2:
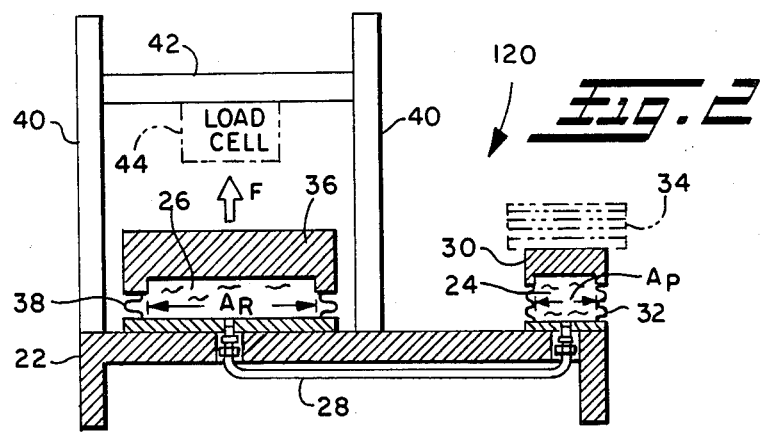
FIG. 2 is a partially sectioned side elevation view of a load cell calibrating device 120 made in accordance with the invention.
Figure 3:
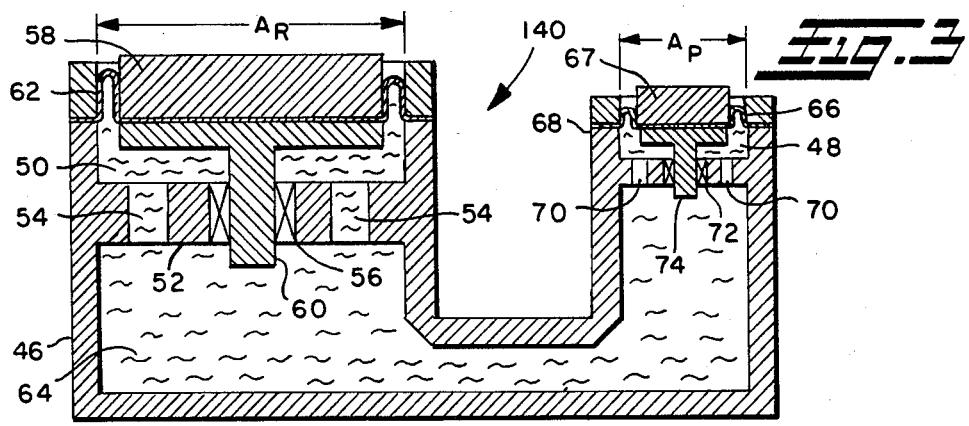
FIG. 3 is a cross-sectional side elevation view of a load cell calibrating device 140 made in accordance with the invention.

The wall surrounding chamber 6 is formed partially by seal 18 and partially by frame 10 whereas for device 120 of FIG. 2 the corresponding chamber walls are formed almost exclusively from corresponding flexible seals and in device 140 of FIG. 3 almost exclusively from rigid frame 46.

Device 100 has a third chamber 8 that provides fluid communication between chambers 4 and 6. Since chambers 4, 6 and 8 are filled with fluid 9, placing deadweights 16 upon member 12 causes member 12 to move downwardly and pressurize fluid 9 which is transferred through chamber 8 to chamber 6 and which causes member 20 to move upwardly and apply force F to load cell 2.

As can be seen from FIG. 1, $A_R$ is greater than $A_P$ so that the upward force of fluid 9 against member 20 is magnified over the downward force against fluid 9 arising from member 12 and deadweights 16.

From the well known fluid relationship between fluid pressure, force and area of F=P/A and the summing of forces, Force F applied to load cell 2 is defined as:

$$F = (A_R/A_P)(W_{1,2\ldots n} + W_P - S_P) - W_R - S_R$$

Additionally, where $W_{1,2,\ldots n}$ is sufficiently large to render $S_P$ and $S_R$ negligible, Force F is defined by the equation:

$$F = (A_R/A_P)(W_{1,2\ldots n} + W_P) - W_R$$

Since $W_P$, $S_P$, $W_R$ and $S_R$ would ordinarily be small in comparison to deadweights 16, it can readily be seen that the downward force of the deadweights is primarily magnified by the ratio $A_R/A_P$ which enables the use of lighter deadweights over that which would be required in the absence of such magnification.

For calculation purposes, Force F will be in pounds when pressure is in pounds per square inches and area is in square inches.

FIG. 2 shows another embodiment of the invention in the form of device 120. Device 120 has a frame 22 supporting spaced apart substantially vertical first chamber 24 and second chamber 26 which have respective cross-sectional areas $A_P$ and $A_R$. A plunger member 30 is disposed above chamber 24 that is adapted to hold standardized deadweights 34 and a flexible seal 32 extends between member 30 and frame 22 to provide a fluid tight seal.

A ram member 36 is disposed above chamber 26 and a flexible seal 38 extends from member 36 to frame 22 to provide a fluid tight seal.

The third chamber providing fluid communication between chambers 24 and 26 is provided by conduit 28 shown in FIG. 2.

Load cell 44 is secured to frame 42 which is vertically adjustable relative to rigid side members 40 so that load cell 44 can be positioned adjacent to ram member 36.

Device 120 operates in the manner hereinbefore described for device 100 to impart a force F to load cell 44 hereinafter defined.

FIG. 3 shows a particularly preferred embodiment of the invention in he form of device 140 which has a substantially unitary construction provided by frame 46. Device 140 has a substantially vertical first chamber 48 that is separated from third chamber 64 by wall 68. A plunger member 67 is disposed above chamber 48 and a flexible seal 66 extends between member 62 and the wall of frame 46 surrounding chamber 48.

Wall 68 is provided with openings 70 for enabling fluid communication between chamber 48 and 64 and is further provided with a bushing 72 having an opening (not referenced) for receiving a portion 74 of member 67 that projects downwardly through the bushing opening to provide sliding engagement between member 67 and the bushing.

Device 140 has a substantially vertical second chamber 50 that is spaced apart from chamber 48 and is separated from third chamber 64 by wall 52 of frame 46. Wall 52 is provided with openings 54 to enable fluid communication between chambers 50 and 64.

A ram member 58 is disposed above chamber 50 and a flexible seal 62 extends between member 58 and the wall of frame 46 surrounding chamber 50 to provide a fluid tight seal.

Wall 52 includes a bushing 56 having an opening (not referenced) that receives a portion 60 of member 58 that projects downwardly through the bushing opening to provide sliding engagement between bushing 56 and member 58.

Although varying in design, device 140 like device 120 operates in the manner hereinbefore described for device 100 to provide a magnified force F for calibrating load cells hereinbefore defined that enables the convenient use of lighter deadweights which enables size diminishment and enhances portability while keeping the hysteresis of the system ($S_P$, $S_R$ and friction in bushings 56 and 72) down to a minimum. Available linear frictionless bearings and seals such as sold under the trademark "Bellafram" are options of bearings and seals that could be used herein while keeping the system hysteresis below 0.01%. The size ratio between $A_R$ and $A_P$ may, for example, be 10 to 1 which would enable one to use deadweights in the 1000 pound range to provide calibrating forces in the 10,000 pound range.

What is claimed is:

1. A fluid operated calibrating device for a load cell, said device including;
substantially vertical spaced-apart first and second chambers for containing the fluid having respective upwardly facing open ends, said first chamber having a cross-sectional area $A_P$ transverse to the vertical direction thereof and said second chamber having a cross-sectional area $A_R$ transverse to the vertical direction thereof that is greater than area $A_P$, a third chamber providing fluid communication between the first and second chambers, a plunger member having a weight $W_p$ disposed above the first chamber, said member operable to move in opposite vertical directions relative the first chamber and having a side thereof facing upwardly from the open end of the first chamber that is adapted to receive standardized deadweights $W_{(1, 2, \ldots n)}$, a ram member having a weight $W_r$ disposed above the second chamber, said member operable to move in opposite vertical directions relative the second chamber and having a side thereof facing upwardly from the open end of the second chamber adapted to apply a force F to the load cell, a first flexible seal extending between the plunger member and a wall surrounding the first chamber, said seal operable to create a resistance $S_p$ in response to movement of the plunger member whilst providing a fluid tight seal for containing the fluid within the first chamber, a second flexible seal extending between the ram member and a wall surrounding the second chamber, said seal operable to create a resistance Sr in response to movement of the ram member whilst providing a fluid tight seal for containing the fluid within the second chamber, said device operable such that when deadweights $W_{(1, 2, \ldots n)}$ are placed upon the plunger member surface, the plunger member moves downwardly to pressurize the fluid within the first, second and third chambers and cause the ram member to move upwardly such that force F is defined by the equation:

$$F=(A_R/A_P)(W_{1, 2 \ldots n}+W_P-S_P)-W_R-S_R.$$

2. The device of claim 1 wherein $W_{(1, 2, \ldots n)}$ is sufficiently large to render $S_P$ and $S_R$ negligible and F is defined by the equation:

$$F=(A_R/A_P)(W_{1, 2 \ldots n}+W_P)-W_R.$$

3. The device of claim 1 wherein the first, second and third chambers are included within a frame having a substantially unitary construction.

4. The device of claim 3 having a wall between the first and third chambers that includes a bushing member having an opening therethrough and the plunger member has at least a portion thereof that projects downwardly through said opening to provide sliding engagement between the bushing and the plunger member.

5. The device of claim 3 or 4 having a wall between the second and third chambers that includes a bushing member having an opening therethrough and the ram member has at least a portion thereof that projects downwardly through said opening to provide sliding engagement between the bushing and the ram member.

* * * * *